United States Patent [19]

Weaver

[11] Patent Number: 5,482,181
[45] Date of Patent: Jan. 9, 1996

[54] PORTABLE LIQUID DRAIN PAN WITH CANTILEVER EXTENSIONS AND POUR SPOUT

[76] Inventor: Donald L. Weaver, 524 S. Georgia, Pittsburg, Kans. 66762

[21] Appl. No.: 406,532

[22] Filed: Mar. 20, 1995

[51] Int. Cl.⁶ ............................................. B65D 23/10
[52] U.S. Cl. .................. 220/573; 184/106; 141/98
[58] Field of Search ................................ 220/571, 573; 184/106; 141/98

[56] References Cited

U.S. PATENT DOCUMENTS

| | | | |
|---|---|---|---|
| 1,506,028 | 8/1924 | Perritt . | |
| 1,554,589 | 9/1925 | Long . | |
| 2,029,781 | 2/1936 | McLean . | |
| 4,488,584 | 12/1984 | Hestehave et al. | 220/573 X |
| 4,727,904 | 3/1988 | Lease . | |
| 4,775,067 | 10/1988 | Mount . | |
| 4,802,599 | 2/1989 | Hill | 184/106 X |
| 4,923,052 | 5/1990 | Englebert . | |
| 4,969,571 | 11/1990 | Bartz | 220/573 X |
| 5,067,530 | 11/1991 | Short, III | 220/573 X |
| 5,402,837 | 4/1995 | Dietzen | 220/573 X |
| 5,421,381 | 6/1995 | Ewald | 141/98 |

Primary Examiner—Steven M. Pollard
Attorney, Agent, or Firm—Kokjer, Kircher, Bowman & Johnson

[57] ABSTRACT

A portable liquid drain pan includes a V-shaped front end having a pour spout centered thereon and includes cantilever extensions projecting forwardly of the front end. When draining the pan, the extensions serve as lever arms to elevate the pouring spout. The extensions also move the pour spout forward toward the center of a bucket placed under the pour spout. A bottom of the drain pan is raised in a stair-step arrangement to direct the liquid to an outer channel between a lowest step and side walls of the container. When the back end of the container is lifted, the liquid travels along this channel to the front of the container. A raised partition formed in the front of each step guides the liquid to the pour spout. Casters are formed on the bottom of the drain pan to improve mobility. The front two casters are positioned slightly behind the front end wall to prevent slippage during draining and to allow the back end of the container to be raised easily. The side walls include C-shaped extensions, to which the extensions are integrally formed. The extensions abut against a vehicles tires, thereby centering the drain pan under the vehicle.

10 Claims, 2 Drawing Sheets

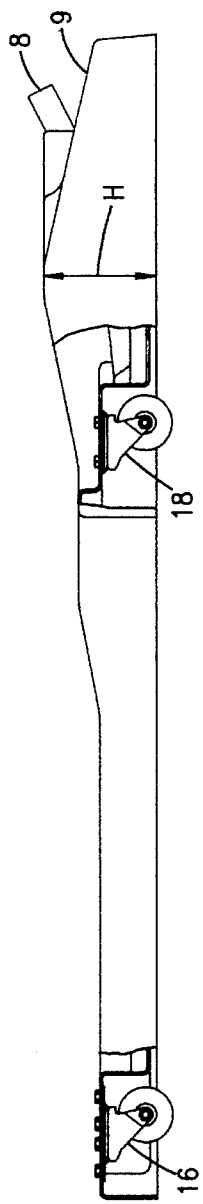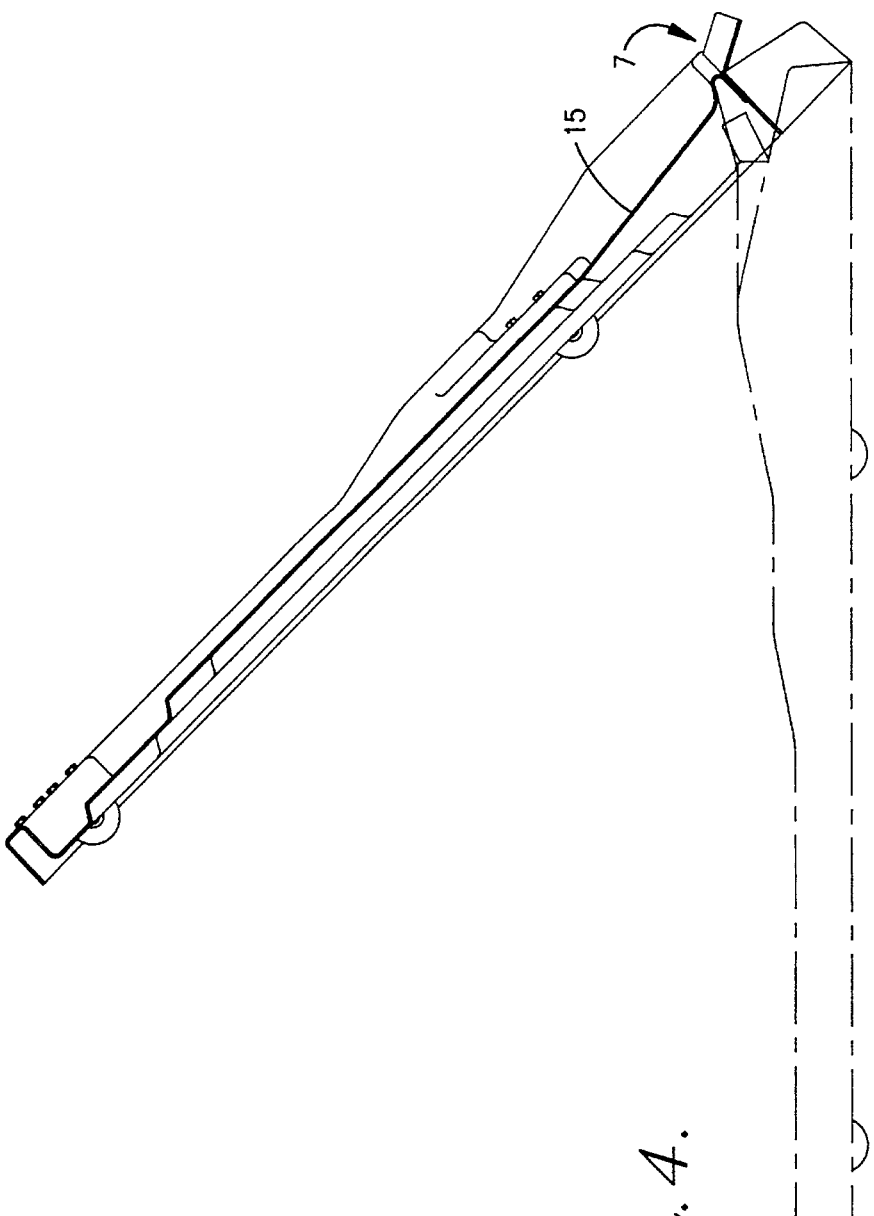

PORTABLE LIQUID DRAIN PAN WITH CANTILEVER EXTENSIONS AND POUR SPOUT

BACKGROUND OF THE INVENTION

1. Field of the Invention

The invention generally relates to a portable liquid drain pan for positioning under motor vehicles and the like.

2. Description of the Related Art

In the past, various systems have been proposed for collecting liquids drained from motor vehicles and the like, such as in the following U.S. Pat. Nos. 1,554,589 to L. D. Long, 1,506,028 to E. E. Perritt, 2,029,781 to J. C. McLean, 4,775,067 to F. E. Mount, 4,727,904 to D. C. Lease and 4,923,052 to G. L. Englebert. The collection systems of Englebert, Long, Mclean and Lease are rectangular in shape, while those of Mount and Perritt are circular. The collection systems of McLean, Long, Mount and Perritt provide casters on the bottom of the collection container.

Also, these collection systems employ different methods for draining the collection pan. Specifically, Englebert's system uses a retention platform that catches/traps fluids (i.e. oil, gasoline, grease) that drip from vehicles. The platform includes a floor panel which is encompassed by a rim. A flexible liner is disposed on the floor panel within the rim and is removed when the liner becomes saturated with liquid. The systems of McLean and Lease provide pumping means for removing the liquid from the container. In Long's system, a drain pipe and plug are provided at the rear and along the bottom of the container. To drain Long's container, Long only suggests removing the plug, without lifting or tilting one side of the container.

Mount's and Perritt's containers include circular walls and a top portion or flange having a hole through its center portion for receiving the liquid. In Mount's container, the cylindrical side walls include an extended ridge nearest the top flange. A pour spout is located along this ridge nearest the intersection of the ridge and the top flange. In Perritt's container, the top flange is inclined upwardly from its outer edge (i.e. the intersection between the flange and side walls) to its inner edge (i.e. the opening for receiving the liquid). Perritt's top flange includes a pipe shaped spout for pouring the liquid out of the container. Both Mount's and Perritt's containers include handles for lifting the container and pouring the liquid therefrom.

However, none of these conventional systems provide a simple collection pan structure that may be dumped into another container without the use of a separate pump or without lifting the entire collection pan off the ground.

SUMMARY OF THE INVENTION

An object of the present invention is to provide a drain pan that is easily emptied into a smaller pan or bucket.

It is another object of the invention to provide, on the drain pan, means operable to elevate the pour spout over a receptacle placed under the pour spout.

Another object of the present invention is to facilitate complete drainage from the drain pan.

Another object of the present invention is to prevent splashing and to guide the liquid to the pour spout when the back end of the container is lifted.

Another object of the present invention is to prevent slippage and allow the back of the container to be lifted easily.

Another object of the present invention is to facilitate centering of the drain pan under the vehicle.

These and other objects are achieved by a portable liquid drain pan that includes a V-shaped front end having a pour spout centered thereon and that includes extensions projecting forwardly of the front end. A bottom of the drain pan is raised in a stair-step arrangement and forms an outer channel between a lowest step and side walls of the container. A raised partition formed in the front of each step guides the liquid from the channel to the pour spout and as reinforcing strength to the structure. Casters are formed on the bottom of the drain pan, the front two casters of which are positioned slightly behind the front end wall to prevent slippage during draining and to allow the back end of the container to be raised easily. The side walls include C-shaped extensions, to which the cantilever extensions are integrally formed.

BRIEF DESCRIPTION OF THE DRAWINGS

The objects and features of the invention noted above are explained in more detail with reference to the drawings, in which like reference numerals denote like elements, and in which:

FIG. 3 is a side elevational view taken from the right side of FIG. 1; and

FIG. 4 is similar side view in a raised position for drainage.

DETAILED DESCRIPTION OF THE INVENTION

Figure 1:
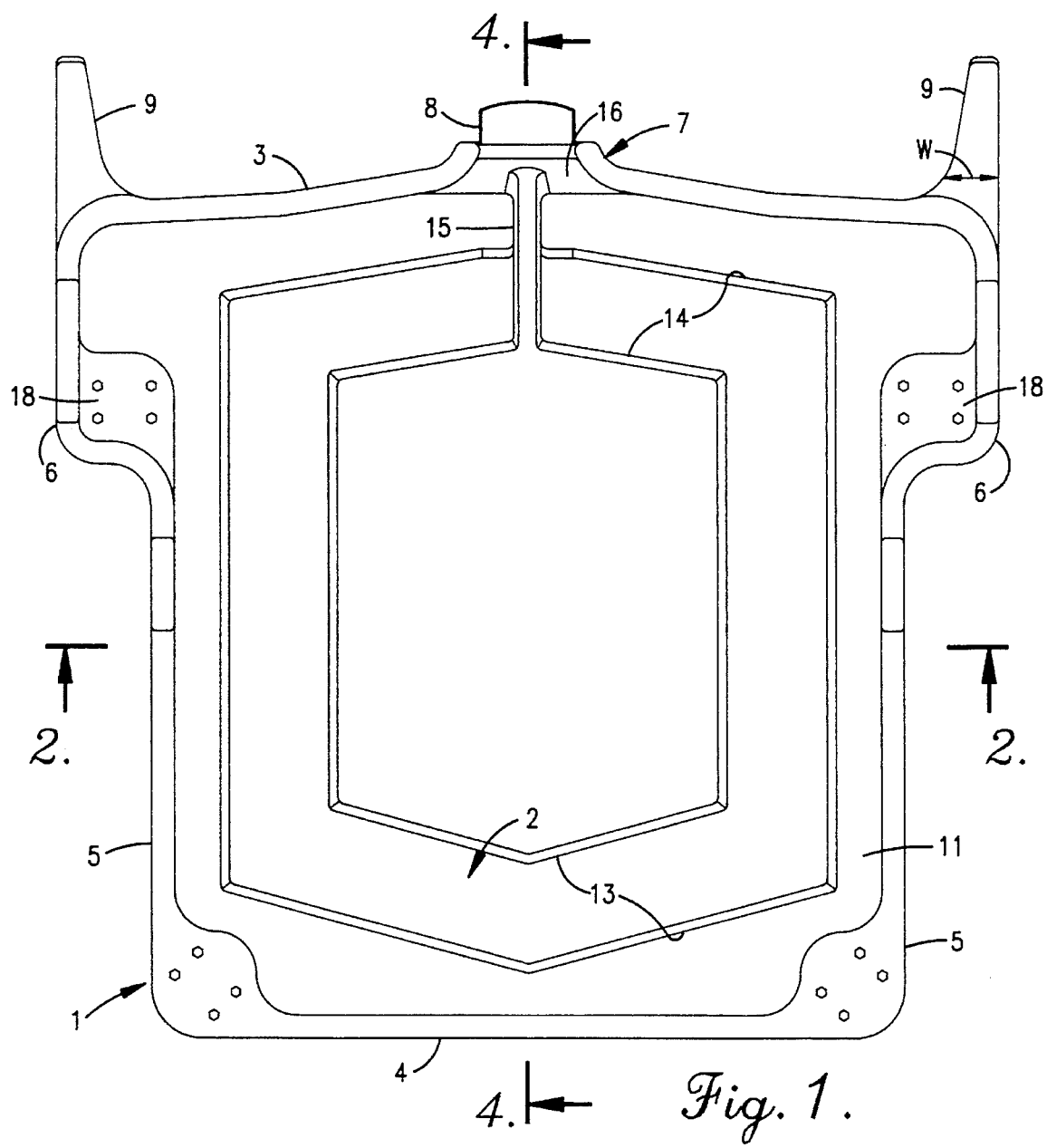
FIG. 1 is a top plan view of the preferred embodiment of the invention.

FIG. 1 discloses a container 1 for receiving liquid drained from a vehicle. The container 1 is formed in a substantially rectangular shape having a bottom 2, a front end wall 3, a back end wall 4 and side walls 5. The front end wall 3 is formed generally as a boat-like prow or V-shape. A segment of each side wall 5 nearest the front end includes C-shaped extensions 6 which abut against the tires during use and serve to center the container under a vehicle. These extensions also provide a wider liquid collection area near the container front thereby minimizing the need to move the container when draining liquid from different points on the vehicle and also adds liquid capacity.

The front end wall 3 includes a pour spout 7 centered along, and located near a top surface of, the front end wall 3. The pour spout 7 includes a lip 8 (FIG. 3) which extends beyond the front end wall 3 and is inclined slightly upward. The placement of the lip 8 allows a pan or other receptacle (not shown) to be placed thereunder for drainage. The incline of the lip 8 prevents dripping after the container 1 is drained.

The front end wall 3 also includes cantilever extensions 9 at the outermost extremities thereof. The extensions 9 are formed integrally with the container 1 and project forwardly of the front end wall 3 in a direction parallel to the side walls 5. As viewed from above (FIG. 1), a width W of the extensions 9 is thickest at an intersection with the front end wall 3 and tapers off slightly toward the outer tip for strength and rigidity during emptying of contents. Also, as viewed from the side (FIG. 3), a height H of each extension 9 is greatest at the intersection with the front end wall 3 and curtails off slightly toward the outer tip.

Figure 2:
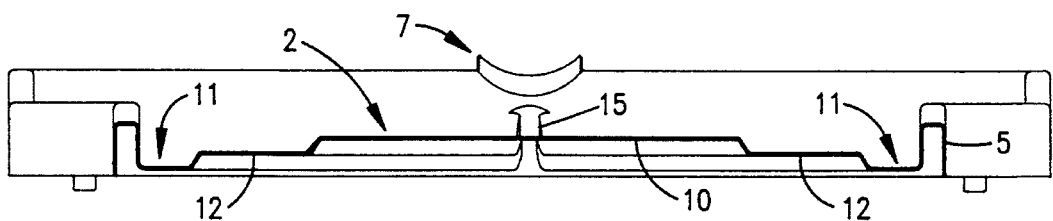
FIG. 2 is a cross-sectional view taken along line 2—2 of FIG. 1 in the direction of the arrows.

As illustrated by cross section in FIG. 2, the bottom 2 of the container 1 is raised at its center in a tier-like or stair-step configuration, each step (10 and 12) of which is angled slightly downward toward the outer edge thereof. As liquid is received by the container 1, this stair-step structure directs the Liquid toward the outer circumference of the container 1 into a channel 11 formed between the outer step 12 and the side walls 5. This configuration also raises the center to keep it from sagging to the floor when the weight of liquid is added. Even if the pan is filled, very little weight is on the raised areas.

To drain the container, a pan (not shown) is placed below the lip 8 and the back end of the container 1 is elevated (as shown in FIG. 4). The extensions 9 function as lever arms (FIG. 4), the outer tips of which are adapted to engage the floor and elevate the pouring spout 7 while draining the container 1. During drainage, the extensions 9 also serve as a pivot point and force the pour spout 7 forward toward the center of the pan.

As the back end of the container 1 is lifted for drainage, the liquid is routed along the channel 11 to the pour spout 7. A side 13 of each step nearest the back end is formed in a V-shaped pattern to ensure that, when the container 1 is lifted, the liquid is not trapped along the back side of any of the steps. The front side 14 of each step is formed integrally with a raised partition 15 which is aligned perpendicular to the front end wall 3 and protrudes into the mouth 16 of the pour spout 7. As the back end of the container 1 is lifted, the liquid flows to the front end of the container 1 and along the front end wall 3. The partition 15 routes the liquid from the channel 11 out through the pour spout 7. The partition 15 also prevents splashing that would otherwise occur when liquid, flowing from opposite sides of the container 1, collided with one another.

To prevent liquid from spilling over the container's front end when tipped (FIG. 4), the front end wall 3 is formed somewhat taller than the back end wall 4 and the side walls 5 are inclined from the back end to the front end. Further, the front end wall 3 and C-shaped extensions 6 are sufficiently tall to form a reservoir for holding liquid after lifting the back end of the container 1 but before the liquid has completely drained. This reservoir allows the user to lift and hold the back of the container at a comfortable height while the liquid drains therefrom.

As illustrated in FIG. 3, the container 1 includes casters 16 and 18 fastened near each corner thereof and formed to rotate in 360° to provide easy maneuvering of the container. Specifically, two casters 16 are located at each back corner and two casters 18 are located at the back side of each C-shaped extension 6 (FIG. 1). The front two casters 18 are placed slightly behind the front end wall 3 to ensure that these casters are lifted shortly after the extensions 9 engage the ground (FIG. 4), to maximize the friction between the extensions 9 and the ground before a majority of the liquid's weight is shifted to the front of the container. Firmly placing the extensions 9 on the ground and lifting the front two casters 18, while the load is substantially evenly dispersed across the container, prevents the container 1 from sliding forward on the front two casters 18 as the container 1 is lifted. Placing the front two casters 18 slightly behind the front end wall 3 also permits the container to be lifted easily by distributing more weight in front of the casters 18.

As illustrated in FIG. 2, side and end walls of the container are hollow to obtain strength and to minimize the materials and weight.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A portable container for collecting liquids drained from vehicles, said container having a bottom, a front end wall and a back end wall and side walls, the container comprising:

a pour spout, formed at a center point along the front end wall, for draining said container into another container, and a pair of cantilever extensions, formed on opposite sides of and projecting beyond the pour spout and extending in a direction forward of the front end wall, for elevating, and moving in said forward direction, said pour spout by engaging a floor when the back end wall of the container is lifted.

2. A portable container for collecting liquids drained from vehicles, according to claim 1, wherein said container is formed in a substantially rectangular shape with a front segment of each side wall including C-shaped extensions for centering said container below a vehicle being drained by abutting against tires on said vehicle.

3. A portable container for collecting liquids drained from vehicles, according to claim 1, wherein said front end wall is formed in a V-shape with said pour spout positioned at an apex thereof and said cantilever extensions positioned at opposite ends of said front end wall.

4. A portable container for collecting liquids drained from vehicles, according to claim 1, wherein said the pour spout includes a lip for preventing dripping and for guiding liquid from the container into another container, said lip extending beyond the front end wall and being slightly inclined upward.

5. A portable container for collecting liquids drained from vehicles, according to claim 1, wherein each of said cantilever extensions has a width and a height which is greatest at a point of intersection between said extension and said front end wall, said width and height tapering off toward outer tips of each extension.

6. A portable container for collecting liquids drained from vehicles, according to claim 1, wherein said bottom includes a center portion, raised in a stair-step configuration, each step being angled slightly downward toward an outer edge thereof, said center portion forming a channel between a lowest step and said front, back and side walls, said center portion directing the liquid into said channel.

7. A portable container for collecting liquids drained from vehicles, according to claim 1, wherein said bottom includes a raised center portion forming a channel between said raised center portion and said front, back and side walls, said channel being contiguous with said pour spout and guiding the liquid to the pour spout when the back end of the container is lifted.

8. A portable container for collecting liquids drained from vehicles, according to claim 7, wherein said raised center portion includes a partition along a front side thereof adjoining said pour spout, said partition being aligned substantially perpendicular to said front end wall and extending across said channel and into a mouth of the pour spout, said partition guiding the liquid from the channel into the pour spout.

9. A portable container for collecting liquids from vehicles, according to claim 1, further comprising:

a plurality of casters attached to said bottom for moving said container.

10. A portable container for collecting liquids drained from vehicles, according to claim 1, wherein said plurality of casters includes two casters, each of which is positioned on opposing side walls and is positioned along said side wall slightly behind the front end wall to prevent slippage while draining the container.

* * * * *